Patented Sept. 5, 1950

2,521,450

UNITED STATES PATENT OFFICE 2,521,450

PROCESS FOR THE PRODUCTION OF REGENERATED CELLULOSE PRODUCTS

Joseph L. Costa, Westchester County, N. Y., assignor to Oscar Kohorn & Co., Ltd., New York, N. Y., a corporation of New York No Drawing. Application July 8, 1947, Serial No. 759,697

5 Claims. (Cl. 260—233)

The present invention relates to an improved process for the production of regenerated cellulose products, and it relates more particularly to an improved process for the manufacture of rayon, transparent cellulose sheeting, sausage casing, and other regenerated cellulose products by the viscose method. In producing rayon, transparent cellulose sheeting and other regenerated cellulose products by the viscose method, pulp, cotton linters, or other cellulose containing materials having a high alpha-cellulose content, i. e. an alpha-cellulose content generally in excess of 90%, are used as a starting material.

The cellulose employed in the form of pulp generally has a cuprammonium viscosity in excess of 12 seconds by the ACS method, with a degree of polymerization in excess of approx. 700.

It is well known that the strength of the regenerated cellulose product, for example rayon, staple fiber or transparent sheeting, is a direct function of the cellulose viscosity going into the manufacture of such product. On the other hand, in order to facilitate the proper extrusion of the cellulosic material into its final form such as filament or a sheet, it is required that the extruded material and hence the cellulose, have a predetermined maximum viscosity. Therefore, the viscosity of the cellulose is limited to a small range.

In the manufacture of rayon by the viscose method, sheets of purified pulp having a viscosity of about 15, and a degree of polymerization of approx. 800, are immersed in a steeping solution of about 15% sodium hydroxide for a predetermined period, to produce alkali cellulose. The excess liquid is then expressed from the alkali cellulose which is then subjected to a shredding operation. Thereafter, the shredded alkali cellulose is suitably aged for several days, in order to de-polymerize the cellulose to the proper viscosity required for spinning.

Another method in de-polymerizing the alkali cellulose is to raise its temperature during the shredding operation sufficiently to accelerate the aging, and then cooling the alkali cellulose. This step requires about two hours to complete. The aged alkali cellulose is then xanthated, the xanthate being dissolved to form viscose which is then ripened to a point just beyond its minimum viscosity, and then the ripened viscose is extruded into a suitable spinning bath. It is obvious that a good deal of time and equipment is consumed in the aging of the alkali cellulose in order to produce a viscose having the required spinning viscosity.

It is, therefore, an object of the present invention to provide an improved process for the production of regenerated cellulose products.

It is another object of the present invention to provide an improved process for the production of regenerated cellulose products by the viscose method.

It is still another object of the present invention to provide an improved process for the production of rayon by the viscose method, which process is characterized by a reduced reduction time.

In accordance with the present invention, a low viscosity cellulosic material, having a high alpha-cellulose content, for example a purified wood pulp having a viscosity of approximately 5 seconds, a degree of polymerization of approx. 500, and an alpha-cellulose content in excess of 90%, may be used as a starting material. In the manufacture of pulp from wood, the wood is chipped, digested, washed and then bleached. Any of these latter steps may be suitably adjusted or altered, to produce a pulp, having the desired viscosity characteristics. For example, it is known that hypochlorite employed for bleaching produces a lower viscosity pulp than the employment of chlorine under correspondingly similar conditions.

The low viscosity pulp is immersed in the form of sheets in a mercerizing solution between 17% and 20%, for example an 18% solution of sodium hydroxide, at a temperature of between 18 and 25° C., for example 20° C., for a period between 40 and 120 minutes, for example 90 minutes, thereby to convert the cellulose into alkali cellulose. The excess liquid is then expressed from the resulting alkali cellulose, so that the ratio of alkali to cellulose is approx. 2 to 1. Thereafter, the alkali cellulose is introduced into a double walled shredder of any well-known type, which comminutes the alkali cellulose into a form desirable for the subsequent xanthation step. During the shredding operation the temperature of the alkali cellulose is permitted to rise as a result of the heat generated during the shredding operation to about 32° C., which temperature should be reached in about 15 minutes. Thereafter, cold water is circulated through the jacket of the shredder, in order to reduce the temperature of the shredded alkali cellulose to about 24° C., which temperature is desirable for the subsequent xanthating step, the time consumed in cooling being approximately another 15 minutes.

During the shredding operation, which consumes in total approximately 30 minutes, the viscosity of the cellulose falls from about 5 seconds to about 3 seconds, and the degree of polymerization drops from about 500 to about 300.

The shredded and depolymerized alkali cellulose is then suitably xanthated by any well known method, the xanthate being dissolved to form viscose, which is then ripened and extruded or cast in any well-known manner.

Inasmuch as it is also practically possible to xanthate alkali cellulose at a temperature in excess of 32° C., it may be desirable and economical to employ a shredder lacking a water jacket. In this case the temperature of the alkali cellulose is permitted to rise, as a result of the heat generated during the shredding operation, until the cellulose has approached the desired viscosity. Thereafter, the cellulose is immediately subjected to the xanthation step. The aforesaid desired viscosity is generally reached before the alkali cellulose attains a temperature in excess of the maximum temperature required for the xanthation step. Further, the de-polymerization of the cellulose during the shredding operation may be further accelerated by exposing the alkali cellulose to ozone, or by mixing with the alkali cellulose any well known de-polymerization accelerator, such as an oxidizing agent.

While there have been described preferred embodiments of the present invention, it is obvious that numerous alterations and omissions may be made without deviating from the spirit thereof.

I claim:

1. In the manufacture of alkali cellulose in a form suitable for the production of viscose, the steps comprising immersing cellulose in sheet form, and having a viscosity not exceeding 5 seconds, in a solution of sodium hydroxide at a concentration between 17 and 25%, for a time sufficient to alkalize said cellulose, and subjecting said alkali cellulose to a shredding operation and permitting the temperature for said alkali cellulose to rise consequent to said shredding, whereby the depolymerizing of said alkali cellulose is accelerated, as a result of the heat generated solely by said shredding operation.

2. In the manufacture of alkali cellulose in a form suitable for the production of viscose, the steps comprising immersing cellulose in sheet form, and having a viscosity not exceeding 5 seconds, in a solution of sodium hydroxide having a concentration of between 17 and 25%, for a time sufficient to alkalize said cellulose, subjecting said alkali cellulose to a shredding operation and permitting the temperature of said alkali cellulose to rise consequent to said shredding, whereby the depolymerization of said alkali cellulose is accelerated, as a result of the heat generated solely by said shredding operation, and then substantially halting said depolymerization upon said alkali cellulose reaching a viscosity not exceeding 4 seconds by reducing the temperature of said alkali cellulose.

3. In the manufacture of alkali cellulose the steps comprising immersing sheets of cellulose, having a viscosity not exceeding 5 seconds, and a degree of polymerization not exceeding 500, into a solution of sodium hydroxide of mercerizing strength, for a time sufficient to alkalize said alkali cellulose, subjecting said alkali cellulose to a shredding operation and permitting the temperature of said alkali cellulose to rise consequent to said shredding, whereby the depolymerization of said alkali cellulose is accelerated as a result of the heat generated solely by said shredding operation, and then rapidly cooling said alkali cellulose, whereby said alkali cellulose attains a viscosity not exceeding 4 seconds, and a degree of polymerization not exceeding 400.

4. In the manufacture of alkali cellulose, the steps comprising immersing sheets of cellulose having a viscosity of approximately 5 seconds in a sodium hydroxide solution of mercerizing strength, for a time sufficient to alkalize said cellulose, subjecting said alkali cellulose to a shredding operation and permitting the temperature of said alkali cellulose to rise consequent to said shredding, whereby the depolymerization of said alkali cellulose is accelerated as a result of the heat generated solely by said shredding operation, and then rapidly cooling said alkali cellulose, whereby, as a result of the depolymerization of said alkali cellulose, and subsequent cooling thereof, the cellulose has obtained a viscosity of approximately 3 seconds, and a degree of polymerization of approximately 300.

5. In the manufacture of alkali cellulose, the steps comprising immersing sheets of cellulose having a viscosity of approximately 5 seconds in a sodium hydroxide solution of approximately 18% concentration, at a temperature of approximately 20° C., for a period of about 90 minutes, expressing the excess liquid from said alkali cellulose, subjecting said alkali cellulose to a shredding operation for a period of approximately 30 minutes, the temperature of the alkali cellulose during the first 15 minutes of said shredding operation being permitted to rise to a temperature of approximately 32° C. solely as a result of said shredding, and thereafter being cooled during the subsequent 15 minutes to a temperature of approximately 24° C.

JOSEPH L. COSTA.

REFERENCES CITED

The following references are of record in the file of this patent:

UNITED STATES PATENTS

| Number | Name | Date |
|---|---|---|
| 1,932,751 | Richter | Oct. 31, 1933 |
| 2,077,164 | Brandes | Apr. 13, 1937 |
| 2,114,605 | Nicoll | Apr. 19, 1938 |
| 2,143,857 | Britton et al. | Jan. 17, 1939 |
| 2,149,309 | Peterson et al. | Mar. 7, 1939 |
| 2,331,935 | Schlosser et al. | Oct. 19, 1943 |

FOREIGN PATENTS

| Number | Country | Date |
|---|---|---|
| 433,414 | Great Britain | Aug. 14, 1935 |